United States Patent
Qiu et al.

(10) Patent No.: US 12,020,526 B2
(45) Date of Patent: Jun. 25, 2024

(54) VEHICLE PARKING CONTROL

(71) Applicant: Ford Global Technologies, LLC, Dearborn, MI (US)

(72) Inventors: Shiqi Qiu, Canton, MI (US); Jayanthi Rao, West Bloomfield, MI (US); Eric Marsman, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1163 days.

(21) Appl. No.: 16/489,131

(22) PCT Filed: Mar. 3, 2017

(86) PCT No.: PCT/US2017/020665
§ 371 (c)(1),
(2) Date: Aug. 27, 2019

(87) PCT Pub. No.: WO2018/160193
PCT Pub. Date: Sep. 7, 2018

(65) Prior Publication Data
US 2020/0005568 A1    Jan. 2, 2020

(51) Int. Cl.
*G07C 9/38* (2020.01)
*G06Q 50/40* (2024.01)
*G07B 15/02* (2011.01)
*G08G 1/09* (2006.01)
*G08G 1/14* (2006.01)

(52) U.S. Cl.
CPC .............. *G07C 9/38* (2020.01); *G06Q 50/40* (2024.01); *G07B 15/02* (2013.01); *G08G 1/094* (2013.01); *G08G 1/149* (2013.01)

(58) Field of Classification Search
CPC .... G08G 1/0175; G08G 1/0133; G08G 1/146; G08G 1/149; G07B 15/02
See application file for complete search history.

(56) References Cited

U.S. PATENT DOCUMENTS

| | | | |
|---|---|---|---|
| 6,081,206 | A | 6/2000 | Kielland |
| 8,374,910 | B1 | 2/2013 | Spasokukotskiy |
| 9,020,687 | B2 | 4/2015 | Mendelson |
| 9,373,197 | B2 | 6/2016 | Dutta et al. |

(Continued)

FOREIGN PATENT DOCUMENTS

| | | |
|---|---|---|
| CN | 104036655 A | 9/2014 |
| EP | 2657914 A2 | 10/2013 |

(Continued)

OTHER PUBLICATIONS

International Search Report and Written Opinion dated May 23, 2017; Appl. No. PCT/US2017/020665.

(Continued)

*Primary Examiner* — Mirza F Alam
(74) *Attorney, Agent, or Firm* — Emily Drake; Bejin Bieneman PLC (57) ABSTRACT

A system includes a computer programmed to, in response to receiving a parking transmission from a parked vehicle, transmit a parking authorization credential to the parked vehicle for rebroadcast from the parked vehicle, the parking authorization credential confirming that the parked vehicle is authorized for a parking location.

19 Claims, 6 Drawing Sheets

(56) References Cited

U.S. PATENT DOCUMENTS

| | | | |
|---|---|---|---|
| 2001/0035830 A1* | 11/2001 | Rosenberg | G06Q 20/127 |
| | | | 340/572.1 |
| 2007/0029825 A1 | 2/2007 | Franklin et al. | |
| 2012/0203557 A1 | 8/2012 | Odinak | |
| 2014/0036076 A1* | 2/2014 | Nerayoff | G06T 7/70 |
| | | | 348/148 |
| 2016/0140774 A1 | 5/2016 | Weinberger et al. | |
| 2016/0284154 A1* | 9/2016 | Schraga | G07F 17/246 |
| 2016/0307156 A1 | 10/2016 | Burner | |
| 2017/0330460 A1* | 11/2017 | Massey | G06Q 10/10 |
| 2018/0336427 A1* | 11/2018 | Gibbs | G06V 20/63 |

FOREIGN PATENT DOCUMENTS

| | | |
|---|---|---|
| KR | 2016003577 A | 1/2016 |
| WO | 2007134606 A1 | 11/2007 |

OTHER PUBLICATIONS

CN Notification of Third Office Action dated Sep. 13, 2022; Appl. No. 2017800879627 (English Translation).

* cited by examiner

VEHICLE PARKING CONTROL

BACKGROUND

Vehicles can be equipped to operate in both autonomous and occupant piloted mode. Vehicles can be equipped with computing devices, networks, sensors and controllers to acquire information regarding the vehicle's environment and to pilot the vehicle based on the information. A vehicle can also be equipped with computing devices, networks, sensors and controllers to transmit, receive and store information to and from other vehicle computing devices and infrastructure computing devices.

Infrastructure computing devices can include smart parking meters to control and acquire revenue associated with vehicle parking. Smart parking meters are operative to communicate wirelessly with vehicles and other infrastructure computing devices such as cloud-based servers to control vehicle parking, including issuing parking tickets. Smart parking meters can be expensive, difficult to maintain, and are deployed to fixed locations. Vehicle parking locations in need of parking control, on the other hand, can be numerous, widespread and subject to frequent change.

DETAILED DESCRIPTION

Disclosed herein is a system, comprising a computer programmed to, in response to receiving a parking transmission from a parked vehicle, transmit a parking authorization credential to the parked vehicle for rebroadcast from the parked vehicle, the parking authorization credential confirming that the parked vehicle is authorized for a parking location. The system can further comprise a computer in the parked vehicle, the computer in the parked vehicle programmed to rebroadcast the parking authorization credential.

The system can further comprise a computer in a parking enforcement vehicle, the computer in the parking enforcement vehicle programmed to receive the parking authorization credential rebroadcast from the parked vehicle and, based on the parking authorization credential, determine that the parked vehicle is in violation of a parking law. It is possible that the computer in the parking enforcement vehicle transmits an electronic parking ticket to the computer in the parked vehicle based on acquiring physical confirmation that the parked vehicle is in violation of the parking law. Further, physical confirmation that the parked vehicle is in violation of the parking law can include acquiring human visual confirmation by an occupant, acquiring computer visual confirmation via vehicle sensors including a video camera and network confirmation via a short-range wireless network, that the parked vehicle is in violation of the parking law.

Further, the computer can determine a probability that the parked vehicle will be in violation of the parking law based on the parking authorization credential.

Further, the computer can direct the parking enforcement vehicle to the parking location based on the probability the parked vehicle will violate a parking law.

The parking authorizing credential can include vehicle identification, a time stamp, payment authorization, the parking location and previous parking information.

The previous parking information can include information regarding parking tickets issued to the parked vehicle in a preceding time period.

The computer in the parked vehicle can include a smartphone.

Further disclosed is a method, comprising receiving a parking signal from a parked vehicle; and transmitting a parking authorization credential to the parked vehicle for rebroadcast from the parked vehicle, the parking authorization credential confirming that the parked vehicle is authorized for a parking location.

The method can further comprise rebroadcasting, from the parked vehicle, the parking authorization credential.

The method can further comprise receiving, in the parking enforcement vehicle, the parking authorization credential rebroadcast from the parked vehicle and, based on the parking authorization credential, determining that the parked vehicle is in violation of a parking law.

The method can further comprise transmitting from the parking enforcement vehicle an electronic parking ticket to the computer in the parked vehicle based on acquiring physical confirmation that the parked vehicle is in violation of the parking law.

The physical confirmation that the parked vehicle is in violation of the parking law can include acquiring human visual confirmation by an occupant, acquiring computer visual confirmation via vehicle sensors including a video camera and network confirmation via a short-range wireless network, that the parked vehicle is in violation of the parking law.

The method can further comprise determining a probability that the parked vehicle will be in violation of the parking law based on the parking authorization credential.

The method can further comprise directing the parking enforcement vehicle to the parking location based on the probability the parked vehicle will violate a parking law.

The method can further comprise directing the parking enforcement vehicle to the parking location by solving a probabilistic traveling salesman problem at time steps using heuristics.

Solving the probabilistic traveling salesman problem at time steps using heuristics directs the parking enforcement vehicle to the parking location having the highest probability of having a parking violation at a current time step.

The parking authorizing credential can include vehicle identification, a time stamp, payment authorization, the parking location and previous parking information.

The previous parking information can include information regarding parking tickets issued to the parked vehicle in a preceding time period.

The method can further comprise determining the probability that the parked vehicle will be in violation of the parking law using Bayesian inference to condition the probability determination based on information regarding parking tickets issues to the parked vehicle in a preceding time period.

The previous parking information includes information regarding all parking tickets issued to parked vehicles in preceding time periods at the parking location.

The method can further comprise determining the probability that the parked vehicle will be in violation of the parking law using Bayesian inference to further condition the probability determination on information regarding past parking behavior at the parking location.

Further disclosed is a computer readable medium storing program instructions for executing some or all of the above method steps. Further disclosed is a computer programmed for executing some or all of the above method steps.

Vehicles can be equipped to operate in both autonomous and occupant piloted mode. By a semi- or fully-autonomous mode, we mean a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering.

Vehicles can be equipped with computing devices, networks, sensors and controllers to pilot the vehicle and to determine maps of the surrounding real, i.e., physical, world including features such as roads. Vehicles can be piloted and maps can be determined based on locating and identifying road signs in the surrounding real world. By piloting we mean directing the movements of a vehicle so as to move the vehicle along a roadway or other portion of a path.

Figure 1:
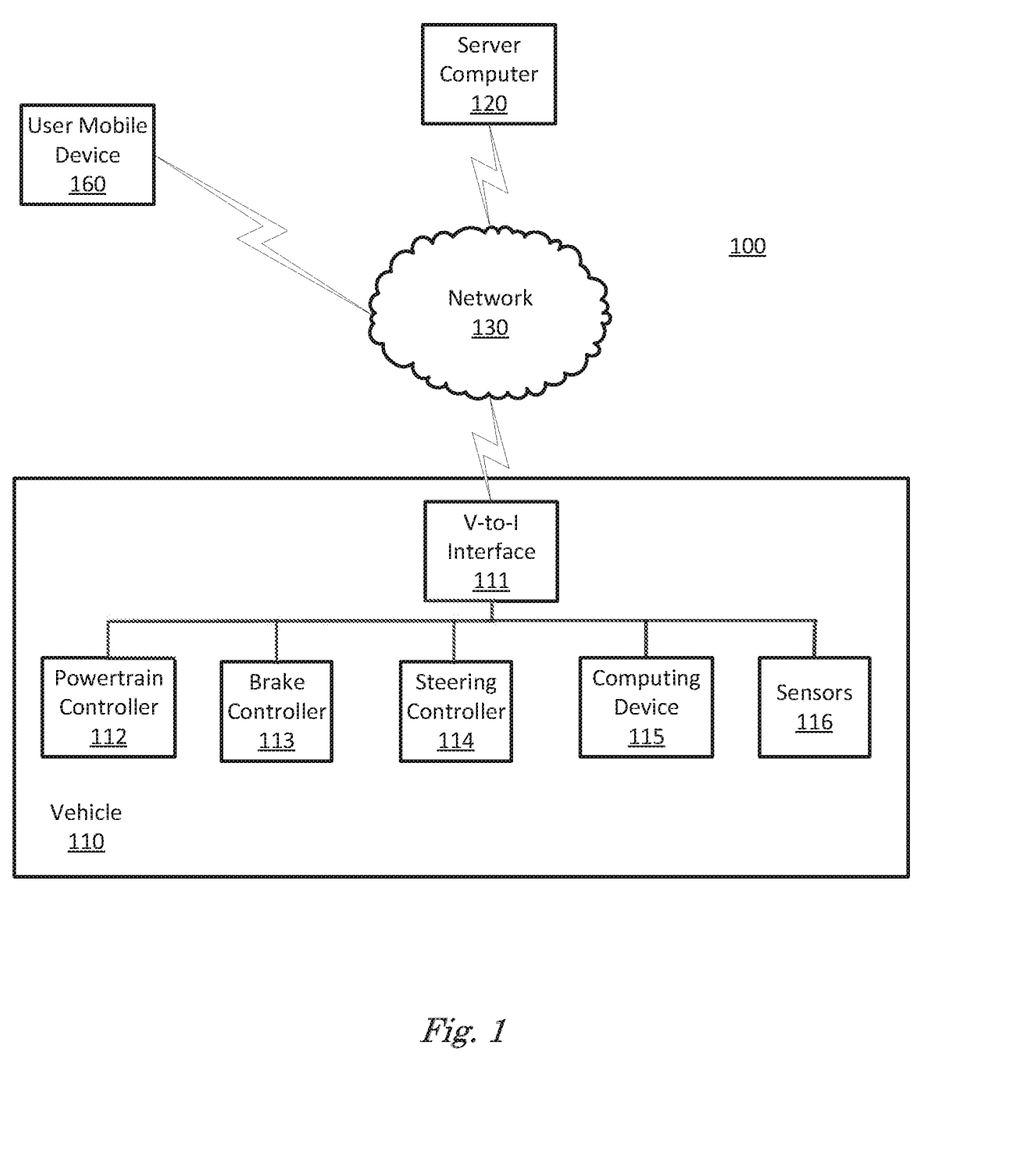
FIG. 1 is a block diagram of an example vehicle.

FIG. 1 is a diagram of a vehicle information system 100 that includes a vehicle 110 operable in autonomous ("autonomous" by itself in this disclosure means "fully autonomous") and occupant piloted (also referred to as non-autonomous) mode in accordance with disclosed implementations. Vehicle 110 also includes one or more computing devices 115 for performing computations for piloting the vehicle 110 during autonomous operation. Computing devices 115 can receive information regarding the operation of the vehicle from sensors 116.

The computing device 115 includes a processor and a memory such as are known. Further, the memory includes one or more forms of computer-readable media, and stores instructions executable by the processor for performing various operations, including as disclosed herein. For example, the computing device 115 may include programming to operate one or more of vehicle brakes, propulsion (e.g., control of acceleration in the vehicle 110 by controlling one or more of an internal combustion engine, electric motor, hybrid engine, etc.), steering, climate control, interior and/or exterior lights, etc., as well as to determine whether and when the computing device 115, as opposed to a human operator, is to control such operations.

The computing device 115 may include or be communicatively coupled to, e.g., via a vehicle communications bus as described further below, more than one computing devices, e.g., controllers or the like included in the vehicle 110 for monitoring and/or controlling various vehicle components, e.g., a powertrain controller 112, a brake controller 113, a steering controller 114, etc. The computing device 115 is generally arranged for communications on a vehicle communication network such as a bus in the vehicle 110 such as a controller area network (CAN) or the like; the vehicle 110 network can include wired or wireless communication mechanism such as are known, e.g., Ethernet or other communication protocols.

Via the vehicle network, the computing device 115 may transmit messages to various devices in the vehicle and/or receive messages from the various devices, e.g., controllers, actuators, sensors, etc., including sensors 116. Alternatively, or additionally, in cases where the computing device 115 actually comprises multiple devices, the vehicle communication network may be used for communications between devices represented as the computing device 115 in this disclosure. Further, as mentioned below, various controllers or sensing elements may provide data to the computing device 115 via the vehicle communication network.

In addition, the computing device 115 may be configured for communicating through a vehicle-to-infrastructure (V-to-I) interface 111 with a remote server computer 120, e.g., a cloud server, via a network 130, which, as described below, may utilize various wired and/or wireless networking technologies, e.g., cellular, BLUETOOTH® and wired and/or wireless packet networks. The computing device 115 also includes nonvolatile memory such as is known. Computing device 115 can log information by storing the information in nonvolatile memory for later retrieval and transmittal via the vehicle communication network and a vehicle to infrastructure (V-to-I) interface 111 to a server computer 120 or user mobile device 160.

As already mentioned, generally included in instructions stored in the memory and executed by the processor of the computing device 115 is programming for operating one or more vehicle 110 components, e.g., braking, steering, propulsion, etc., without intervention of a human operator. Using data received in the computing device 115, e.g., the sensor data from the sensors 116, the server computer 120, etc., the computing device 115 may make various determinations and/or control various vehicle 110 components and/or operations without a driver to operate the vehicle 110. For example, the computing device 115 may include programming to regulate vehicle 110 operational behaviors such as speed, acceleration, deceleration, steering, etc., as well as tactical behaviors such as a distance between vehicles and/or amount of time between vehicles, lane-change, minimum gap between vehicles, left-turn-across-path minimum, time-to-arrival at a particular location and intersection (without signal) minimum time-to-arrival to cross the intersection.

Controllers, as that term is used herein, include computing devices that typically are programmed to control a specific vehicle subsystem. Examples include a powertrain controller 112, a brake controller 113, and a steering controller 114. A controller may be an electronic control unit (ECU) such as is known, possibly including additional programming as described herein. The controllers may communicatively be connected to and receive instructions from the computing device 115 to actuate the subsystem according to the instructions. For example, the brake controller 113 may receive instructions from the computing device 115 to operate the brakes of the vehicle 110.

The one or more controllers 112, 113, 114 for the vehicle 110 may include known electronic control units (ECUs) or the like including, as non-limiting examples, one or more powertrain controllers 112, one or more brake controllers 113 and one or more steering controllers 114. Each of the controllers 112, 113, 114 may include respective processors and memories and one or more actuators. The controllers 112, 113, 114 may be programmed and connected to a vehicle 110 communications bus, such as a controller area network (CAN) bus or local interconnect network (LIN) bus, to receive instructions from the computer 115 and control actuators based on the instructions.

Sensors 116 may include a variety of devices known to provide data via the vehicle communications bus. For example, a radar fixed to a front bumper (not shown) of the vehicle 110 may provide a distance from the vehicle 110 to a next vehicle in front of the vehicle 110, or a global positioning system (GPS) sensor disposed in the vehicle 110 may provide geographical coordinates of the vehicle 110. The distance(s) provided by the radar and/or other sensors 116 and/or the geographical coordinates provided by the GPS sensor may be used by the computing device 115 to operate the vehicle 110 autonomously or semi-autonomously.

The vehicle 110 is generally a land-based autonomous vehicle 110 having three or more wheels, e.g., a passenger car, light truck, etc. The vehicle 110 includes one or more sensors 116, the V-to-I interface 111, the computing device 115 and one or more controllers 112, 113, 114.

The sensors 116 may be programmed to collect data related to the vehicle 110 and the environment in which the vehicle 110 is operating. By way of example, and not limitation, sensors 116 may include, e.g., altimeters, cameras, LIDAR, radar, ultrasonic sensors, infrared sensors, pressure sensors, accelerometers, gyroscopes, temperature sensors, pressure sensors, hall sensors, optical sensors, voltage sensors, current sensors, mechanical sensors such as switches, etc. The sensors 116 may be used to sense the environment in which the vehicle 110 is operating such as weather conditions, the grade of a road, the location of a road or locations of neighboring vehicles 110. The sensors 116 may further be used to collect data including dynamic vehicle 110 data related to operations of the vehicle 110 such as velocity, yaw rate, steering angle, engine speed, brake pressure, oil pressure, the power level applied to controllers 112, 113, 114 in the vehicle 110, connectivity between components and electrical and logical health of the vehicle 110.

Figure 2:
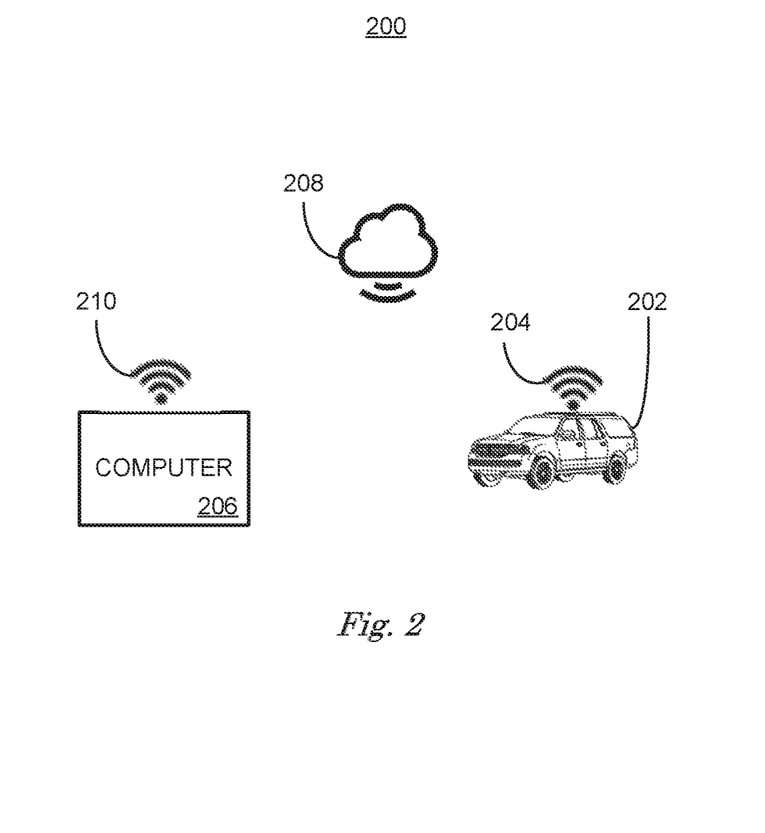
FIG. 2 is a diagram of a parking scene.

FIG. 2 is a diagram of a parking scene 200 in which a parked vehicle 202 transmits a message including parking information via a network interface 204 to a computer 206 via a network interface 210 and network 208. Parked vehicle 202 can be equipped with a computing device 115 and a network interface 204, which can be a V-to-I interface 111, as described above in relation to FIG. 1. Network 208 can be a network 130 an include wireless networking technologies, e.g., cellular, BLUETOOTH® and wired and/or wireless packet networks as described above in relation to FIG. 1.

Computing device 115 in parked vehicle 202 can transmit a message including parking information via V-to-I interface 111 and/or transmit a message including parking information with a smart phone. Portable devices, e.g., smart phones and the like, can include a computing device, a memory and a network interface, operative to communicate with computer 206 via network 208 and network interface 210. Smart phones can also communicate with computing device 115 parked vehicle 202 to obtain parking information via wired or wireless networking technologies e.g., cellular, BLUETOOTH® and wired and/or wireless packet networks as described above in relation to FIG. 1. Parking information can include the GPS location, a parking request and a time stamp. Parking information can also include payment information, for example credit card information, in cases where a fee is associated with the requested parking location and time.

Computer 206 can receive the parking information including the parking request and apply parking rules to determine how to process the request. Computer 206 can be a computing device located remotely from parking scene 200 including one or more processors and one or more memories including one or more non-volatile memories, for example. Computer 206 can be a server computer 120, operative to host cloud-based apps, for example. Computer 206 includes a network interface 210 operative to transmit and receive messages to and from parked vehicle 202 via network 208. Network 208 may utilize various wired and/or wireless networking technologies, e.g., cellular, and wired and/or wireless packet networks. Network 208 can be part of a vehicle network infrastructure, which includes computing devices and networks required to support vehicle-to-infrastructure and vehicle-to-vehicle communications used by V-to-I interface 111. Computer 206 can be programmed to receive messages from vehicles 202 via network 208 including messages including parking information.

When computer 206 accepts the parking request, computer 206 can accept payment for the requested parking, if a charge is associated with the parking location, or a separate transaction can occur between computer 206 and parked vehicle 202 fulfilling payment obligations. In either case, when the parking request is accepted, computer 206 can send authorization credentials to computing device 115 in parked vehicle 202 via V-to-I interface 111 or send the authorization credential to a smart phone via network 208, depending upon the source of the parking request. In cases where authorization credentials are received by a smart phone, the authorization credentials can be transferred to computing device 115 in parked vehicle 202 via wireless networking technologies, e.g., cellular, BLUETOOTH® and wired and/or wireless packet networks as described above in relation to FIG. 1

Parking scene 200 can be an example of a cloud-based parking application, wherein computer 206 hosts cloud-based parking applications as described in relation to FIGS. 2-6. For example, parking applications can use technology to detect parking spot availability and handle payments via cloud-based parking applications running on smart phones and smart meters. Smart meters are parking meters that include computing devices with network interfaces connecting them to cloud-based parking applications via networks. Smart meters provide good user experiences and good analytics, where analytics include information regarding who is using the smart meter at each time-period, for example. Smart meters also have high installation cost and high rates of failure and high maintenance costs.

Another problem is enforcing free street and lot parking with time limits. Some municipalities institute time limits to provide parking in commercial areas for restaurants and business, etc. Some municipalities permit parking in residential areas during daytime hours only to residents. In some cases, a vehicle must move, at least to a different parking spot, after the vehicle has exceeded a time limit. Without some technology to record and track vehicle's parking behavior, enforcement of parking time limits can be dependent upon human intervention to determine when a vehicle is parked in a parking spot beyond legal time limits. For example, a parking enforcement officer can record license plate numbers either in person or via surveillance video at predetermined time intervals to determine how long vehicles have been parked.

Computer 206 and network 208 can implement parking control as discussed above at a large number of parking locations within reach of the network 208 with a large number of parked vehicles 202 equipped with a network interface 204. Parking locations can be indicated using inexpensive, easily changed signage, or parking locations can be indicated electronically, using location technology such as GPS or wireless triangulation to locate a parked vehicle 202. Computer 206 and network 208 can replace smart meters at a much lower cost per parking location with a greater ability to change parking locations.

Figure 3:
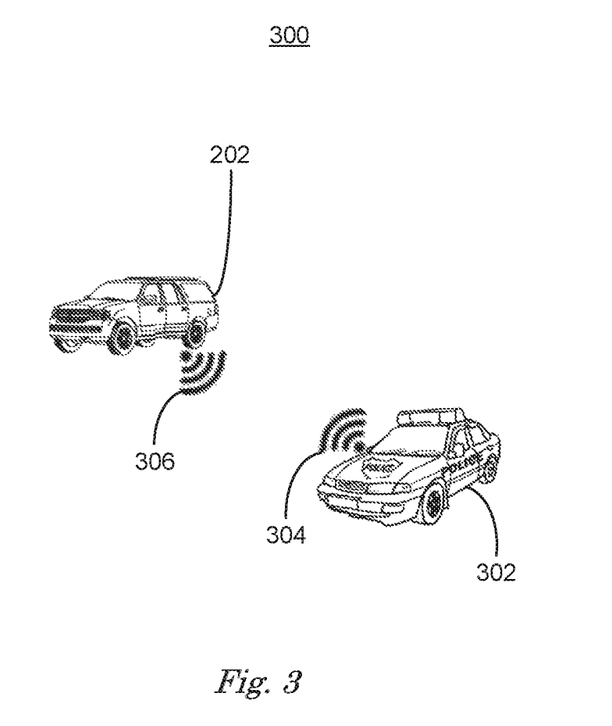
FIG. 3 is a second diagram of a parking scene.

FIG. 3 is a diagram of a parking scene 300, with a parked vehicle 202 having a low-power, local-area wireless network interface 306, based on, for example, BLUETOOTH® low energy (BLE). Low-power, local-area wireless network 306 can permit computing device 115 in parked vehicle 202 to communicate with a computing device 115 in parking enforcement vehicle 302 via low-power, local-area network interface 304, based on, for example, BLE. The low-power, local-area wireless network 308 in vehicle 202 can be programmed to wait in standby or sleep mode for a message from parking enforcement vehicle 302, and then wake upon receiving a message. In standby or sleep mode, computing device 115 in parked vehicle 202 is set to consume minimum power by pausing computation, for example. Low-power, local-area wireless network interface 304 can be programmed to listen for wireless messages at low power, and alert computing device 115 in parked vehicle 202 when a message addressed to parked vehicle 202 is received. When this alert is received, computing device 115 in parked vehicle 202 can wake from standby or sleep mode and receive the message from parking enforcement vehicle 302 via low-power, local-area wireless network interface 306.

Upon receipt of a message from traffic enforcement vehicle 302, computing device 115 in parked vehicle 202 transmits parking information including authorization credentials to parking enforcement vehicle 302 via low-power, local-area wireless network interfaces 304, 306. Parking information transmitted to parking enforcement vehicle 302 can include authorization credentials, when the vehicle parked, how long the parking was paid for, in cases where payment is required, vehicle identification including vehicle model and plate information, and other information including previous parking tickets in a predetermined time-period, as applicable, for example. Upon receipt of this information, a computing device 115 in parking enforcement vehicle 302 determines if the message from parked vehicle 202 is valid based on the authorization credentials. If the message is determined to be valid, computing device 115 in parking enforcement vehicle 302 can determine if parked vehicle 202 is in violation of a parking law. Failure to send valid authorization credentials can be considered a violation of a parking law per se. When computing device 115 in parking vehicle 302 determines that a parking law has been violated, computing device 115 in parking enforcement vehicle 302 can transmit an electronic parking ticket to computing device 115 in parked vehicle 202 via low-power, local-area wireless network interfaces 304, 306.

An electronic parking ticket is a message that includes a command to pay a penalty for violation of a parking rule. In cases where the parking rule is a law enacted by a local civil authority such as a city or town, the penalty can be in the form of a summons to pay a fine, with further penalties for ignoring the summons. In cases where the parking rule is enacted by a private entity, such as a homeowner's association or religious organization, for example, the penalty can be approbation of peers.

When parked vehicle 202 receives the electronic parking ticket, computing device 115 in parked vehicle 202 can store the electronic parking ticket in non-volatile memory. When an occupant returns to the parked vehicle 202, computing device 115 can be programmed to alert the occupant that an electronic parking ticket has been received upon "key-on", using any one of several human interface devices including audio (simulated speech, tones) and visual (alphanumeric displays, icons), etc. Key-on is when an occupant signals computing device 115 that the occupant intends to direct vehicle 202 to travel, in either autonomous or non-autonomous mode, as discussed above in relation to FIG. 1. Computing device 115 in parked vehicle 202 can also be programmed to send a message to a smart phone via V-to-I interface 111 to alert the occupant that an electronic parking ticket has been received.

Advantages of this technique for communicating parking information between parking vehicles 202 and parking enforcement vehicles 302 include elimination of parking meters, smart or otherwise, in parking areas, thus streamlining the needed technical infrastructure to support a parking regime. Parking areas only need be labeled to permit occupants to park in the correct locations. Parked vehicle 202 stores the parking payment and ticket information. Parked vehicle 202 communicates parking and vehicle identification information to parking enforcement vehicle 302. Parking enforcement vehicle 302 determines if a parking law has been violated. Parking enforcement vehicle 302 can include a human parking enforcement officer that determines that a parking law has been violated and issues the electronic parking ticket using computing device 115 in parking enforcement vehicle 302. Alternatively, parking enforcement vehicle 302 can be autonomous, and computing device 115 in parking enforcement vehicle 302 can make a determination that a parking law has been violated using video and other sensors and known machine-vision techniques and issue an electronic parking ticket to parked vehicle 202 without human involvement. Electronic parking tickets can also be issued tele-robotically, where an autonomously piloted parking enforcement vehicle 302 can be occasionally tele-operated by a human parking enforcement officer at a location remote from the parking scene 300 to confirm parking law violations through transmitted sensor data, for example.

Figure 4:
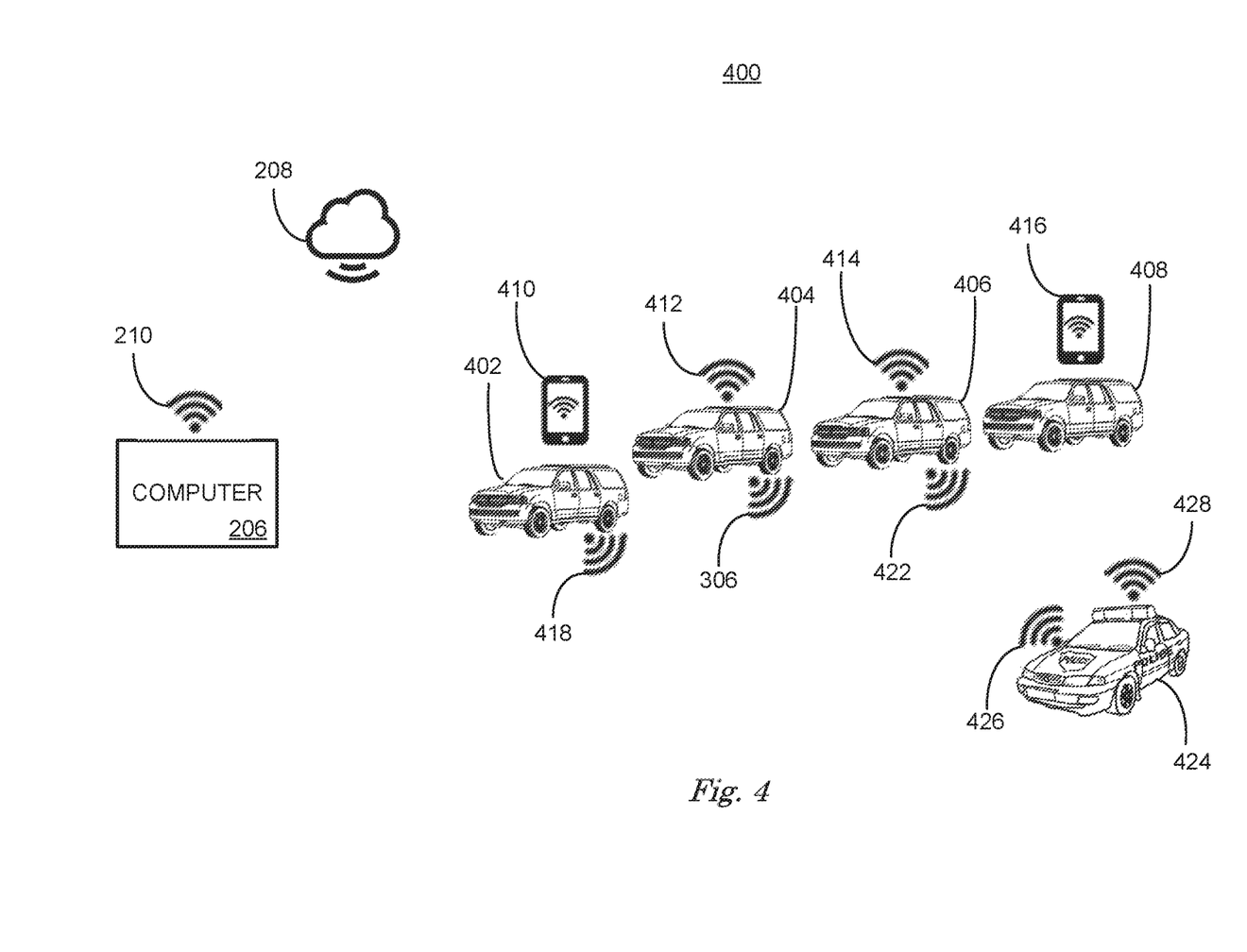
FIG. 4 is a third diagram of a parking scene.

FIG. 4 is a diagram of a parking scene 400, in which parked vehicles 402, 408 communicate with computer 206 via network 208 using smart phones 410, 416 and parked vehicles 404, 406 communicate with computer 206 via network 208 using V-to-I interfaces 111. In either case, parked vehicles 402, 404, 406, 408 can receive authorization credentials from computer 206 via network 208. Parking enforcement vehicle 424 can transmit messages to parking vehicles 402, 404, 406 via low-energy, local-area network interfaces 418, 420, 422 and, in return, receive parking information. Based on the received parking information, including authorization credentials, parking enforcement vehicle 424 can transmit electronic traffic tickets to parking vehicles 402, 404, 406 if they are in violation of a parking law as described above in relation to FIG. 3.

Parked vehicle 408 is not equipped with a low-power, local-area network interface and can therefore not transmit or receive messages to and from parking enforcement vehicle 424. In this case, parking enforcement vehicle 424 can communicate with computer 206 via network 208 using a V-to-I interface 111 as discussed above in relation to FIG. 1. Parking enforcement vehicle 424 can transmit a message identifying vehicle 408 and requesting parking information regarding vehicle 408. If smart phone 416 associated with (e.g., carried by a user in) vehicle 408 has communicated with computer 206 and received authorization credentials, parking enforcement vehicle 424 can determine if vehicle 408 is in violation of a parking law by requesting parking information for vehicle 408 from computer 206. If parking enforcement vehicle 424 determines that vehicle 424 is in violation of a parking law, parking enforcement vehicle 424 can send an electronic parking ticket to the smart phone 416 associated with vehicle 408. As seen by this example, determining parking information for a vehicle 408 by sending requests to computer 206 from parking enforcement vehicle 424 is possible, but not preferred. Sending messages to vehicles requesting parking information using secure communications as described in relation to FIGS. 3 and 4 does not depend upon network 208 or computer 206 availability nor does it use network 208 or computer 206 resources.

Determining parking information for vehicles 402, 404, 406, 408 when the vehicles 402, 404, 406, 408 are not in violation of a parking law can permit parking enforcement vehicle 424 to predict when parked vehicles 402, 404, 406, 408 might be in violation of a parking law in the future. For example, parking enforcement vehicle can send messages to parked vehicles 402, 404, 406, 408 and determine the order in which parking time allotted to the parked vehicles 402, 404, 406, 408 will expire. Parking enforcement vehicle can use this information to re-visit parking locations of parked vehicles 402, 404, 406, 408 in the order in which the parking time allotted to each of the parked vehicles expires, thereby visiting the parked vehicles 402, 404, 406, 408 at the appropriate time to determine if they have exceeded their allotted parking times.

Figure 5:
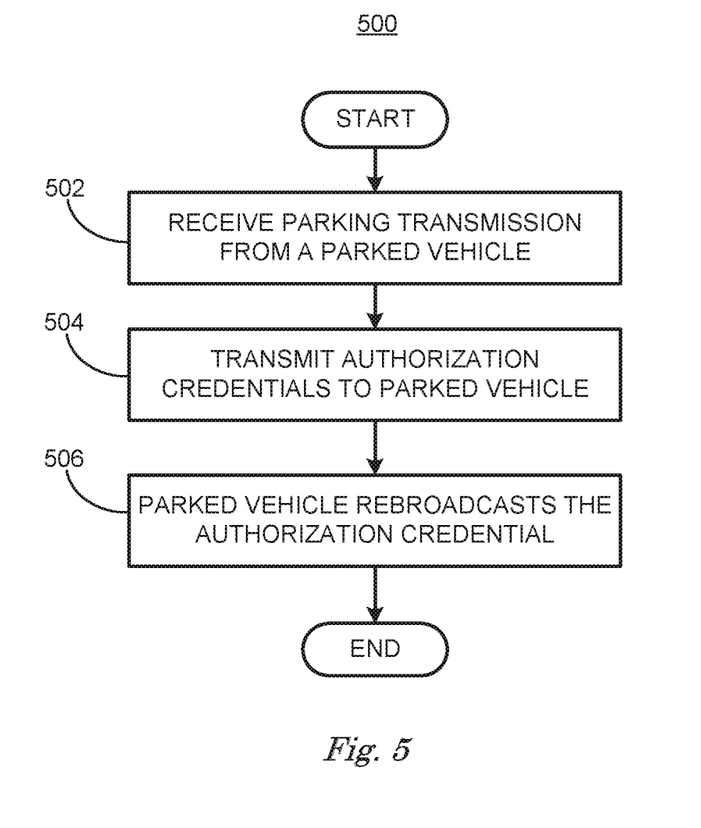
FIG. 5 is a flowchart diagram of an example process for vehicle parking.

FIG. 5 is a diagram of a flowchart, described in relation to FIGS. 1-4, of a process 500 for secure electronic parking, e.g., as described above. Process 500 can be implemented by a processor of computing device 115, taking as input information from sensors 116, and executing instructions and sending control signals via controllers 112, 113, 114, for example. Process 500 includes multiple steps taken in the disclosed order. Process 500 also includes implementations including fewer steps or can include the steps taken in different orders.

Process 500 begins at step 502 where a computer 206 receives a parking transmission from a parked vehicle 202. The parking transmission can include time parked, payment information, if required, and vehicle identification via network 208 as discussed above in relation to FIG. 2. At step 504, in response to the parking transmission from parked vehicle 202, computer 206 can transmit authorization credentials to parked vehicle 202. At step 506, parked vehicle 202 can receive a secure message from a parking enforcement vehicle 302 requesting parking information as described above in relation to FIG. 3. In response to the secure message from parking enforcement vehicle 302, parked vehicle 202 can rebroadcast the authorization credentials along with parking information to parking enforcement vehicle 302 as described above in relation to FIG. 3. Parking enforcement vehicle can use the received authorization credentials to securely determine if the parking information received from parked vehicle 202 is valid. If parking enforcement vehicle 302 determines that the parking information message is valid, the parking enforcement vehicle 302 can determine if parked vehicle 202 is in violation of a parking law, and, if so, parking enforcement vehicle can transmit an electronic traffic ticket to parked vehicle 202. Following this process 500 ends.

In summary, process 500 describes a process wherein computer 206 receives a message from a parked vehicle 202, and responds by transmitting authorization credentials to the parked vehicle 202. In response to a message from a parking enforcement vehicle 302, parked vehicle 202 transmits authorization credentials and parking information. Based on the authorization credentials and parking information, parking enforcement vehicle 202 can determine if parked vehicle 202 is in violation of a parking law and issue an electronic parking ticket.

Figure 6:
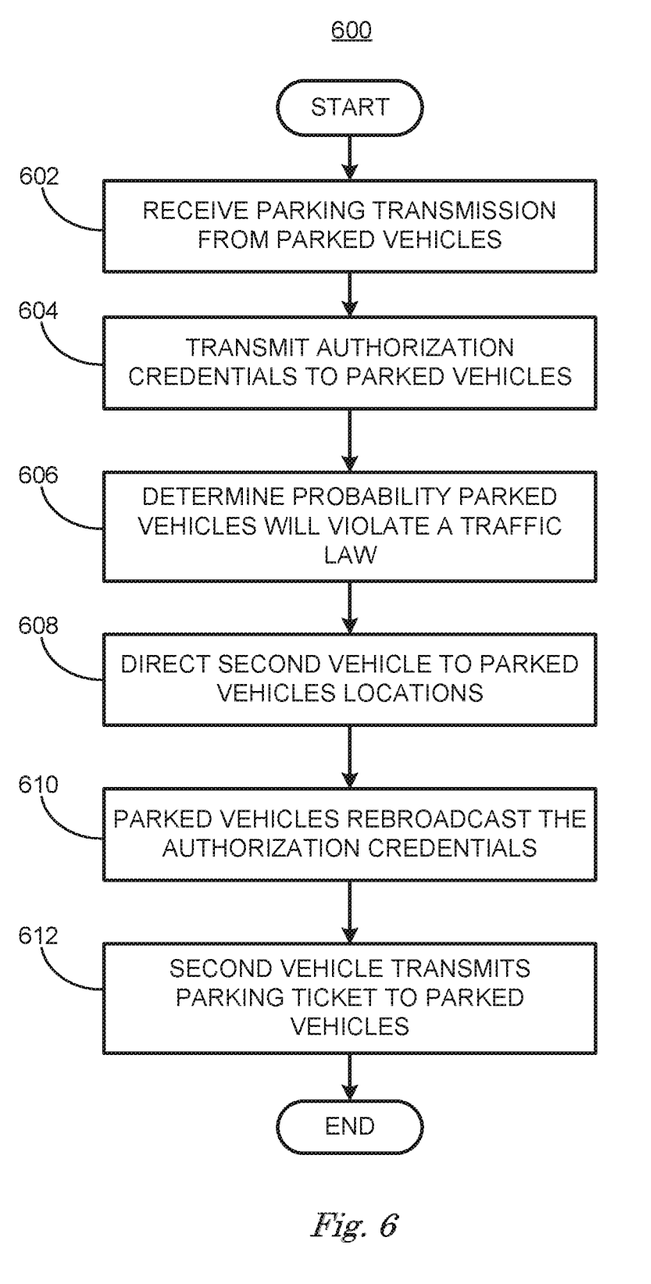
FIG. 6 is a second flowchart diagram of an example process for vehicle parking.

FIG. 6 is a diagram of a flowchart, described in relation to FIGS. 1-4, of a process 600 for secure electronic parking. Process 600 can be implemented by a processor of computing device 115, taking as input information from sensors 116, and executing instructions and sending control signals via controllers 112, 113, 114, for example. Process 600 includes multiple steps taken in the disclosed order. Process 600 also includes implementations including fewer steps or can include the steps taken in different orders.

Process 600 starts at step 602, where computer 206 receives parking transmissions from parked vehicles 402, 404, 406, 408 as described in relation to FIG. 4. At step 604, computer 206 transmits authorization credentials to vehicles 402, 404, 406, 408 and at step 606, computer 206 calculates a probability that each of the parked vehicles 402, 404, 406, 408 will be in violation of a parking law at predetermined future time intervals. This probability can be calculated based on the observed parking behavior at each location at each time-period of the day. Some parking locations will have a higher rate of violations at certain times than others in predictable patterns.

For example, each parking location $l_i$, where i=1, ..., n and n is the number of parking locations, can have associated with it a probability $p_t(l_i)$, which is the probability that a violation of a parking law will occur at parking location $l_i$ at time step t. These probabilities $p_t(l_i)$ can be determined by examining historical records for parking tickets issued for each parking location $l_i$ at time steps t that span the historical time periods. A time step can be about 10 minutes, for example. By determining the frequency with which a violation of parking laws has occurred at each parking location at each past time step, and determining patterns in the frequencies relative to overall frequencies as a function of date and time of day, a probability that a violation will occur at a specific future time step t can be predicted, for example.

At each future time step t computer 206 can predict the probabilities that a violation will occur at each parking location $l_i$. The simplest implementation would direct enforcement vehicle 424 to the parking location associated with the highest probability of having a violation of parking laws at the current time step. Since the parking locations are numerous, widespread, and the predicted probabilities of a vehicle being in violation of a parking law are changing without notice, the parking location having the highest probability of having a violation of parking laws will likely change at each time step, seemingly at random. This can lead to inefficiencies in travel and consequent missed opportunities to issue parking tickets, as parking enforcement vehicle 424 spends time traveling rather than issuing parking tickets at parking locations.

A solution to this problem is to apply a probabilistic traveling salesman algorithm to the parking location probabilities $p_t(l_i)$. A traveling salesman algorithm is an algorithm for determining a minimum cost/maximum reward path that visits a predetermined number of nodes, where the cost of traveling between nodes and the reward for visiting each node is known. The problem is solved when a path is determined that visits a predetermined number of nodes with a minimal cost and maximal reward. Solutions to probabilistic traveling salesman problems are known to be non-polynomial complete, meaning that polynomial-time solutions are not available to solve these problems. Probabilistic traveling salesman problems can be solved using heuristic methods such as partitioning the nodes in space and time and solving for a highest-probability subset of nodes in limited partitions and combining the results, for example. Within the limited partition the subset of nodes can be a small enough sample to permit exhaustive solutions, for example.

The problem in this case is constrained because the predicted reward (probability of violation p) for each parking location $l_i$ can change at each time step t. The solution to this is to arrange the parking location probabilities $p_t(l_i)$ in space and time by location and time step and solve the probabilistic traveling salesman problem in this three-dimensional space to determine each path with the correct predicted parking location probabilities $p_t(l_i)$ for each location in space and time. Based on a solution to a probabilistic traveling salesman algorithm in the three-dimensional probability space, a path can be determined, for a finite number of time steps in the future, that visits at least a subset of the parking locations in a determined order that maximizes rewards while minimizing cost.

A probabilistic traveling salesman algorithm is used to make the calculations more tractable. Since parking locations can be numerous and widespread, a probabilistic traveling salesman algorithm can eliminate most of the parking locations from the calculations by only considering a small subset of parking locations with the highest probabilities of having a violation of parking laws at a particular time step. In this way, the highest probability parking locations are favored for visiting and the calculations include far fewer nodes, both desirable results.

In addition to the past history for each parking location, the past parking behavior for each parked vehicle 402, 404, 406, 408 can be considered. Computer 206 can have access to each parked vehicle's 402, 404, 406, 408 history of parking violations, for example, and can determine a probability that a particular parked vehicle 402, 404, 406, 408 will violate a parking law based on past behavior. Since the computer 206 knows which parked vehicle 402, 404, 406, 408 has requested which parking location, the probabilities for the location, time period and parking behavior can be combined to determine predicted probabilities for violating a parking law at a particular parking location for the parked vehicle 402, 404, 406, 408 by conditioning the probability p that a violation of parking laws will occur at a location $l_i$ at a time step t conditioned on a predicted probability that a vehicle $v_i$ will be in violation of a parking law at parking location $l_i$, is equal to a function $p_t(l_i|v_i)$, based on Bayesian inference. Bayesian inference can determine the probability of a second event given the probability of a first event, where the first and second events have related probability distributions. The probabilistic traveling salesman algorithm discussed above can be solved using conditional probabilities $p_t(l_i|v_i)$ that take into account both a probability that a parking location will experience a violation of a parking law and a probability that a particular vehicle $v_i$ will violate a parking law at that parking location.

Let $P_t$ be a vector equal to the probabilities $p_t(l_i|v_i)$, the probabilities of a violation of a parking law occurring at parking locations l given the probability of a parking law violation by vehicles v at time t for i=1, ..., n. A highest probability subset of $P_t$ can be formed $S_t$ that includes only the locations l with the highest probability. The number of locations l in the subset $S_t$ can be limited to about the number of parking locations that can be visited at a single time step, for example. The subset $S_t$ can be further subdivided into k smaller, disjoint sets $S_t^1, S_t^2, \ldots, S_t^k$, where the disjoint sets can each include smaller numbers of nearby parking locations. These disjoint sets can be formed using known clustering algorithms to group nearby locations. These disjoint sets can be ranked by total rewards minus cost and solved in order of net reward rank by heuristic techniques including exhaustive search. The solutions each represent a path through space and time. These paths can be transmitted to parking enforcement vehicle 424 to direct the parking enforcement vehicle 424 to parking locations l at current time t. When current time step t passes, and becomes time step t+1, computer 206 can determine a new set of paths based on new disjoint sets $S_{t+1}^1, S_{t+1}^2, \ldots, S_{t+1}^k$, to transmit to parking enforcement vehicle 424. Paths transmitted to parking enforcement vehicle 424 can be based on predicted probabilities for a predetermined number of future time steps.

At step 608 the determined solution to the probabilistic traveling salesman problem in the form of a path can be used to direct traffic enforcement vehicle 424 to a parking location having a highest probability of having a parked vehicle 402, 404, 406, 408 in violation of a parking law. Computer 206, can, based on parking transmissions received from parked vehicles 402, 404, 406, 408, determine a path for parking enforcement vehicle 424 that visits parking locations of parked vehicles 402, 404, 406, 408 in order of currently highest probability that a parking law will be violated thereby maximizing reward, while traveling the shortest path, and thereby minimizing cost. This path can be updated by computer 206 as parked vehicles 402, 404, 406, 408 enter and leave the parking scene 400 and re-transmitted to parking enforcement vehicle 424. At step 610, parking enforcement vehicle sends messages to parked vehicles 402, 404, 406, 408 and in response, parked vehicles 402, 404, 406, 408 rebroadcast the authorization credentials received at step 604 to parking enforcement vehicle 424. At step 612 parking enforcement vehicle 424 determines that a parking law has been violated and transmits an electronic parking ticket to one or more parked vehicles 402, 404, 406, 408 as discussed above in relation to FIG. 4. Following this process 600 ends.

In summary, process 600 is a process for receiving parking transmissions from parked vehicles 402, 404, 406, 408, with a computer 206 and transmitting authorization credentials to parked vehicles 402, 404, 406, 408. Computer 206 determines probabilities that parked vehicles 402, 404, 406, 408 will violate parking laws at future time periods and determines a path that will permit traffic enforcement vehicle 424 to visit the parking locations of parked vehicles 402, 404, 406, 408 in an order that maximizes the probability that traffic enforcement vehicle will visit a parking location while parked vehicles violate a parking law while minimizing travel. Parked vehicles 402, 404, 406, 408 rebroadcast authorization credentials to permit parking enforcement vehicle to determine that a parking law has been violated and issue an electronic parking ticket to the parked vehicle 402, 404, 406, 408 in violation of the parking law.

Computing devices such as those discussed herein generally each include instructions executable by one or more computing devices such as those identified above, and for carrying out blocks or steps of processes described above. For example, process blocks discussed above may be embodied as computer-executable instructions.

Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

We claim:

1. A system, comprising:
    a server computer, programmed to:
        in response to receiving a parking transmission from a parked vehicle at a parking location, transmit a parking authorization credential to the parked vehicle that confirms that the parked vehicle is authorized for a parking location; and
    a computer in the parked vehicle, programmed to:
        upon receiving a message from a second vehicle, transmit, from the parked vehicle, the parking authorization credential confirming that the parked vehicle is authorized for the parking location.

2. The system of claim 1, further comprising a computer in the parked vehicle, the computer in the parked vehicle programmed to rebroadcast the parking authorization credential.

3. The system of claim 2, further comprising a computer in a parking enforcement vehicle, the computer in the parking enforcement vehicle programmed to receive the parking authorization credential rebroadcast from the parked vehicle and, based on the parking authorization credential, determine that the parked vehicle is in violation of a parking law.

4. The system of claim 3, wherein the computer in the parking enforcement vehicle transmits an electronic parking ticket to the computer in the parked vehicle based on acquiring physical confirmation that the parked vehicle is in violation of the parking law.

5. The system of claim 4, wherein physical confirmation that the parked vehicle is in violation of the parking law includes acquiring human visual confirmation by an occupant, acquiring computer visual confirmation via vehicle sensors including a video camera and network confirmation via a short range wireless network, that the parked vehicle is in violation of the parking law.

6. The system of claim 5, wherein the computer determines a probability that the parked vehicle will be in violation of the parking law based on the parking authorization credential.

7. The system of claim 6, wherein the computer directs the parking enforcement vehicle to the parking location based on the probability the parked vehicle will violate a parking law.

8. The system of claim 7, wherein the parking authorizing credential includes vehicle identification, a time stamp, payment authorization, the parking location and previous parking information.

9. The system of claim 8, wherein the previous parking information includes information regarding parking tickets issued to the parked vehicle in a preceding time period.

10. The system of claim 2, wherein the computer in the parked vehicle includes a smartphone.

11. A method, comprising:
    receiving a parking signal from a parked vehicle at a parking location;
    transmitting a parking authorization credential to the parked vehicle that confirms that the parked vehicle is authorized for a parking location; and
    upon receiving, in the parked vehicle, a message from a second vehicle, transmit, from the parked vehicle, the parking authorization credential confirming that the parked vehicle is authorized for a parking location.

12. The method of claim 11, rebroadcasting, from the parked vehicle, the parking authorization credential.

13. The method of claim 12, further comprising receiving, in the parking enforcement vehicle, the parking authorization credential rebroadcast from the parked vehicle and, based on the parking authorization credential, determining that the parked vehicle is in violation of a parking law.

14. The method of claim 13, further comprising transmitting from the parking enforcement vehicle an electronic parking ticket to the computer in the parked vehicle based on acquiring physical confirmation that the parked vehicle is in violation of the parking law.

15. The method of claim 14, wherein physical confirmation that the parked vehicle is in violation of the parking law includes acquiring human visual confirmation by an occupant, acquiring computer visual confirmation via vehicle sensors including a video camera and network confirmation via a short range wireless network, that the parked vehicle is in violation of the parking law.

16. The method of claim 15, further comprising determining a probability that the parked vehicle will be in violation of the parking law based on the parking authorization credential.

17. The method of claim 16, further comprising directing the parking enforcement vehicle to the parking location based on the probability the parked vehicle will violate a parking law.

18. The method of claim 17, wherein the parking authorizing credential includes vehicle identification, a time stamp, payment authorization, the parking location and previous parking information.

19. The method of claim 18, wherein the previous parking information includes information regarding parking tickets issued to the parked vehicle in a preceding time period.

\* \* \* \* \*